United States Patent [19]
Fildes et al.

[11] 3,801,458
[45] Apr. 2, 1974

[54] PROCESS FOR PREPARING CEPHALOSPORIN DERIVATIVES

[75] Inventors: Robert Anthony Fildes, Bouth near Ulverston; James Rowland Potts, Marlow; John Eaton Farthing, Southall, all of England

[73] Assignee: Glaxo Laboratories Limited, Greenford Middlesex, England

[22] Filed: Apr. 18, 1972

[21] Appl. No.: 245,258

[30] Foreign Application Priority Data
Apr. 21, 1971 Great Britain.................... 10566/71
Mar. 28, 1971 Great Britain.................... 10566/71

[52] U.S. Cl. ................................. 195/29, 195/36 R
[51] Int. Cl............................................. C12d 9/00
[58] Field of Search........................... 195/29, 36 R

[56] References Cited
UNITED STATES PATENTS
3,658,649   4/1972   Arnold et al.......................... 195/29

Primary Examiner—Alvin E. Taneholtz
Attorney, Agent, or Firm—Bacon & Thomas

[57] ABSTRACT

A process for the preparation of a 7$\beta$-acylamido-cephalosporin having a 7$\beta$-substituent selected from 5-carboxy-5-oxopentanamido and 4-carboxybutanamido includes the step of contacting a corresponding compound having a 7$\beta$-(D-5-amino-5-carboxypentanamido) group with activated cells of Trigonopsis variabilis under aerobic conditions, catalase activity being present in said cells when the desired product has a 7$\beta$-(5-carboxy-5-oxopentanamido) group.

13 Claims, No Drawings

PROCESS FOR PREPARING CEPHALOSPORIN DERIVATIVES

This invention is concerned with an enzymic oxidation process for the production of derivatives of the antibiotic cephalosporin C.

The cephalosporin compounds referred to in this specification are generally named with reference to cepham (see J.Am.Chem.Soc. 1962, 84, 3,400). The term "cephem" refers to the basic cepham structure with a single double bond.

Cephalosporin C [3-acetoxymethyl-7β-(D-5-amino-5-carboxypentanamido) ceph-3-em-4-carboxylic acid] may be prepared by fermentation and then employed as the starting material for the preparation of a wide variety of cephalosporin derivatives. As is well known, the 3-acetoxymethyl group may be converted to unsubstituted methyl or methyl substituted with a variety of substituents as described in the literature. Moreover, it is often desired to modify the 7β-(D-5-amino-5-carboxypentanamido) group of cephalosporin C, either before or after any modification at the 3-position. This generally involves N-deacylation to give (in the case of cephalosporin C itself), 3-acetoxymethyl-7β-aminoceph-3-em-4-carboxylic acid (7-aminocephalosporanic acid or, briefly, 7-ACA); this intermediate is then employed to prepare 7β-acylamido analogues of cephalosporin C having modified antibacterial activity. However, N-deacylation of cephalosporin C and derivatives thereof modified in the 3-position has raised many difficulties. Although 7-ACA can be prepared from cephalosporin C in fair yield by various processes, there is a need for alternative methods offering advantages.

The present invention is concerned with a novel process for the oxidation of the 7β-side chain of cephalosporin compounds having a 7β-(D-5-amino-5-carboxypentanamido) group. The oxidation destroys the zwitterionic character of the side chain and greatly simplifies subsequent N-deacylation.

In copending U.S. Pat. application Ser. No. 846,963 filed Aug. 1, 1969 and now U.S. Pat. No. 3,658,649 dated Apr. 25, 1972, there is disclosed a method of oxidising the side chain on the 7β-amino group in cephalosporin C enzymically to provide derivatives which may readily be N-deacylated to 7-ACA. According to the aforementioned Specification, a D-amino acid oxidase of fungal origin was employed, the enzyme being released from the fungal cells before use by one of a variety of methods involving lysis of the cells. The enzyme was then purified, if desired, e.g. by fractionation with ammonium sulphate. Such lysis of the fungal cells was considered necessary since the intact cells were not found to bring about the desired reaction.

It has now been found that the side chain on the 7β-amino group of cephalosporin C is oxidised in the presence of activated cells of the yeast *Trigonopsis variabilis*. By "activated" is meant that the yeast cells have been subjected to some physical and/or chemical process which makes the D-amino acid oxidase therein available for catalysis of the oxidation of cephalosporin C but does not result in substantial release of the enzyme, i.e., the cells have been permeabilized.

Accordingly one aspect of this invention provides activated cells of *Trigonopsis variabilis*.

A variety of methods of activation are described hereinafter.

The invention will be described herein with reference to the oxidation of cephalosporin C and derivatives thereof wherein the acetate group in the side chain at the 3-position has been replaced by the residue of a nucleophile or a hydroxy group or a hydrogen atom, but it should be understood that the activated cells may be employed to oxidise other D-amino acid substrates, provided these are capable of being oxidised by the isolated enzyme.

Another aspect of the invention, therefore, provides a process for the preparation of cephalosporin compounds of the general formula:

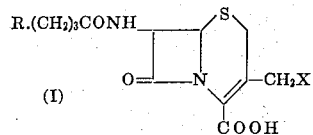

or salts thereof, wherein X is an acetate group, the residue of a nucleophile, a hydroxy group or a hydrogen atom and R is the group -CO.COOH or -COOH which comprises subjecting a compound of formula:-

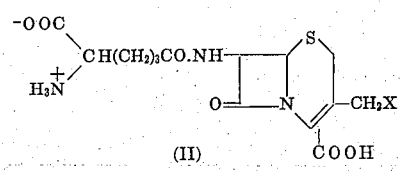

or a salt thereof, wherein X is as defined above, to the action of activated cells of *Trigonopsis variabilis* under aerobic conditions, catalase activity being present in said cells when the group R in the desired product is -CO.COOH.

Examples of salts of the compounds (I) and (II) are sodium and potassium salts.

A suitable strain of *Trigonopsis variabilis* is that obtained from the Centraal Bureau voor Schimmelcultur, Baarn, Holland, under culture number CBS 4095.

The use of activated cells of *Trigonopsis variabilis* instead of a more or less highly purified preparation of the D-amino acid oxidase has several practical advantages. First the time-consuming and involved purification procedure is eliminated and replaced by a simple activation process.

Secondly, it has been found that the D-amino acid oxidase enzyme in activated cells of *Trigonopsis variabilis* is less easily inhibited or inactivated than the isolated enzyme when used in broths resulting from the fermentation of *Cephalosporium acremonium* Brotzu. This is a point of much practical importance, since for convenience it is often desired to oxidise cephalosporin C without isolating it from the fermentation broth. Sucn isolation is notoriously difficult, by reason of the amphoteric nature of the compound, and further processing of the cephalosporin C without isolation is practically very advantageous. It was found that the fermentation broth, even after partial purification such as by removal of mycelium and precipitation of protein, contained factors which tended to inhibit fungal D-amino acid oxidases. For this reason, a large excess of enzyme was necessary to ensure satisfactory reaction.

By contrast, when activated cells of *Trigonopsis variabilis* are employed in place of the crude or purified enzyme, the enzyme appears to be protected from inhibition to a large extent, and a much smaller amount is effective.

Finally, the use of activated cells is convenient in that they provide an insoluble enzyme system which can be recovered and re-used, whereas purification and reuse of the soluble enzyme is of limited practicability.

Thus it will be seen that the use of activated cells to oxidise cephalosporin C constitutes a substantial advance in the art of cephalosporin chemistry.

The process of activating the cells of *Trigonopsis variabilis* may be conducted in a number of ways. e.g. as described herein. It is not known what mechanism is involved, but the effect is that the required enzyme is made available for oxidation of cephalosporin C, while non-activated, intact, cells have no activity in this reaction. It must be emphasised that the D-amino acid oxidase does not appear to be liberated into the exocellular fluid by the process of activation: the activity is associated with the cells rather than the supernatant, which can be replaced without affecting the activity. The supernatant has no detectable D-amino acid oxidase activity.

Furthermore, it has been found that the activity of activated cells is substantially equivalent to that of the D-amino acid oxidase released therefrom by lysis, e.g. by ultrasonication. In the presence of inhibitors found in cephalosporin C fermentation broths, the activity of the activated cells is superior.

The activation process is brought about by subjecting the cells to certain mildly injurious conditions which are not however extreme enough to cause lysis. Examples of such treatments are:

a. Freezing followed by thawing at acid pH e.g. about pH 3 – 4; the freezing may be at a temperature below −10°, e.g. about −20° C. The freezing should be of sufficient duration to be effective, e.g. at least one hour at −20°.

b. Treatment of the cells in an aqueous phase with one or more organic solvents. Suitable solvents include lower aliphatic ketones e.g. acetone; aliphatic and araliphatic mono- and poly-hydric alcohols e.g. 2-phenylethanol or lower alcohols such as n-butanol; and aliphatic or aromatic hydrocarbons e.g. cyclohexane, benzene or toluene. Toluene is the preferred solvent. Treatment at a temperature below 60° C, e.g. at about 37° C for about 30 minutes, will often be found to result in activation without substantial lysis.

c. Treatment with a surface active agent. The agent may be employed as an aqueous solution at a concentration of e.g. 0.01–20 percent, preferably 0.1–10 percent and advantageously 1 – 10 percent (all percentages being by weight or volume as appropriate). The time and temperature of treatment may be as described under (b). Suitable cationic surfactants include quaternary ammonium compounds e.g. cetyltrimethylammonium, cetylpyridinium and cetyldimethylbenzylammonium halides.

As suitable anionic surfactants may be mentioned higher alkyl sulphates having e.g. 10–18 carbon atoms, for example dodecyl sulphate. Such compounds will generally be used as their salts with inorganic or organic bases, e.g. as alkali metal or ethanolammonium salts. Other anionic surfactants which may be found of value include alkali metal e.g. sodium salts of alkylaryl sulphonates or of sulphonated castor oil and alkali metal salts of bile acids such as sodium desoxycholate.

Non-ionic surfactants e.g. sorbitan monolaurate, Triton X100 ( a condensation product of iso-octylphenoxypolyethoxyethanol and ethylene oxide manufactured by Rohm and Haas Company, Philadelphia, U.S.A.) or digitonin may be used.

d. Treatment with alkali. Raising the pH of the medium in which the yeast is suspended has been found to activate the cells satisfactorily. A suitable alkali is an aqueous alkali metal hydroxide e.g. sodium or potassium hydroxide, and an effective concentration is about N/100. Quaternary ammonium hydroxides or alkali metal carbonates may also be used. The time and temperature of treatment may be as described under (b).

e. Osmotic shock. Activation may be brought about by subjecting the *Trigonopsis* cells to extremes of osmotic pressure. The cells may for instance be suspended in a solution of high osmotic pressure e.g. a 2M sucrose solution buffered to pH 8, for a short period of time. e.g. 30 minutes, after which the suspension is rapidly diluted with water.

It may be necessary to ascertain the optimum conditions of activation for the chosen activation method by trial and error experimentation. It should be appreciated that the activation may be affected by various factors including temperature, duration of treatment, pH of environment and concentration of reagent. Regardless of the method of activation chosen, the cells should be maintained in contact with water throughout and after the step of activation.

A comparison by electron microscopical examination of untreated *Trigonopsis* cells with cells after toluene activation showed that the toluene activated cells remained essentially intact but had undergone a complete breakdown of cytoplasmic organiation, leaving no recognisable internal structures.

The yeast may be cultured by known techniques. It has been found that superior D-amino acid oxidase activity is obtained if the culture medium contans D (or DL)-methionine; possibly this compound acts to induce enzyme formation. The level of D-amino acid oxidase activity depends markedly on the conditions of culturing.

D-Amino acid oxidase activity may be estimated most satisfactorily by determining the rate of formation by hydrogen peroxide spectrophotometrically using the hydrogen donor o-phenylenediamine as indicator.

In the presence of peroxidase, o-phenylenediamine is oxidised by the hydrogen peroxide to form a brown dye.

Compounds of formula (I) wherein R is the group -CO.COOH are prepared by reacting the appropriate compound of formula (II) with D-amino acid oxidase in the presence of catalase. The latter enzyme is normally present in the activated yeast cells, but extra catalase may be added if required. The amount of additional catalase required may readily be determined by preliminary trial and experiment. The function of the catalase is to prevent oxidative decarboxylation resulting in the formation of compounds of formula (I) in which R is the group -COOH instead of the desired compounds (R is the group -CO.COOH); the compounds of formula (I) in which R is the group -CHO are intermediates in this oxidative decarboxylation.

Compounds of formula (I) wherein R is the group -COOH are prepared by inhibiting any catalase present in the yeast cells. Even when the catalase has been inhibited, the product generally contains a minor proportion of α-keto acid (R = -CO.COOH). Inhibition may be brought about by chemical or physical means.

Suitable catalase inhibitors are ascorbic acid, 3-amino-1,2,3-triazole and inorganic azide. Alkali metal azides, particularly sodium azide, are preferred. The inhibitor may be present in the reaction mixture during the conversion of the cephalosporin starting material to the desired compound or may be used to pretreat the *Trigonopsis variabilis* cells prior to their use in the conversion.

Thus sodium azide may be added to the reaction mixture at a level of for example, 1 mM to 100 mM, or, if one wishes to avoid the presence of relatively large quantities of azide in the reaction mixture, the sodium, or other alkali metal, azide can be added to a suspension of the activated *Trigonopsis* cells and allowed to remain in contact with them until no substantial catalase activity can be detected. We have found it convenient to add up to molar concentrations of sodium azide e.g. 500 mM to a cell suspension in buffer solution and leave for 15 hours at a temperature between 0°C and 40° C e.g. 4° C.

Alternatively the catalase in the yeast cells may be deactivated by heat treatment, prior to the use of the cells in the conversion process. We have found that the D-amino acid oxidase and catalase present in the cells have different heat stabilities and this differential enables one to inactivate the catalase preferentially. Thus if the cells are incubated at 40°-60°, preferably at about 50° for at least 3 hours their catalase activity is markedly reduced, while D-amino acid oxidase activity remains. Although the heat treatment may be carried out on cells in a simple aqueous or buffered suspension it is particularly convenient to subject the cells to the treatment while they are simultaneously undergoing treatment with an "activation" reagent. For example activation treatment with a solvent such as toluene may be carried out at 50° C for 4 hours to achieve simultaneous inhibition of catalase and cell activation.

The reaction of the enzyme system of the activated cells with the compound of formula (II) may be effected at a pH of from 4 to 9 and e.g. 6 to 8. Temperatures between ambient and about 65° C, e.g. 30° – 40° C, may be used. However, both with regard to pH and temperature, conditions must not be selected which result in deactivation of the enzyme. An enzyme level of not less than 5 units/mg. (as defined below) of isolated cephalosporin starting material should preferably be utilised. At this level, a reaction time of at least 3 hours may be necessary. With higher enzyme levels, e.g. 6 – 500 preferably about 100 units/mg., shorter reaction times, e.g. ½ hour, are possible. With cephalosporin fermentation broths (either crude or partially purified) in general an enzyme level not less than 10 units/mg should be used.

Stirring, together with aeration, either with air or oxygen is required. The amount of agitation and aeration will depend on the scale of operation.

The compounds of formula (I) in which R is a -CO.-COOH group are not very stable and the reaction conditions, and especially the reaction times (which should be short e.g. ½ – 2 hours), need to be carefully chosen.

As already mentioned, cephalosporin C is difficult to extract from fermentation broths due to its amphoteric structure and hydrophilic nature. The process of the present invention may be effected in situ (before or after removal of the mycelium) in a cephalosporin C fermentation broth under appropriate conditions and the resulting compounds of formula (I) (X = acetoxy) recovered. The process is normally effected after acidification and filtration of the broth. Thereafter the resulting compounds of formula I may be recovered by solvent extraction or by adsorption on a column of ion exchanger.

The compounds of formula (I) where X is an acetate group may be conveniently extracted from the aqueous solution in which they have been prepared, for example by acidification to a pH of 2.5 or less and extraction with an appropriate organic solvent, e.g. ethyl acetate or n-butanol. Multiple extractions with ethyl acetate will give substantially complete extraction, but the efficiency can be improved by making the aqueous phase saturated, or substantially saturated, with a water-soluble inert inorganic salt e.g. sodium chloride.

In isolating the products from both fermentation broths and simple aqueous solutions, a system using a combination of an ion-exchanger and solvent extraction has been found to give good results. Suitable ion-exchangers are the high molecular weight liquid amine anion exchangers sold by Rohm and Haas Co. under the names Amberlite LA1, LA2, and LA3 (LA1 and LA2 are secondary amines; LA3 is a primary amine). Preferred solvents for use in conjunction with the liquid anion-exchangers are n-butanol and butyl acetate.

A system which has been used with particular advantage in extractions from deproteinised cephalosporin fermentation broths is Amberlite LA1 in n-butanol, followed by back extraction with sodium bicarbonate solution and subsequent extraction into ethyl acetate. The pH of the broth is preferably reduced below 6 and most advantageously to 3-5 before extraction.

The solid resin, Amberlite XAD2, which is a macroreticular, cross-linked polystyrene polymer, may also be used in extracting compounds of formula (I) where X is an acetate group from crude or deproteinised cephalosporin fermentation broths. A suitable solvent for eluting the adsorbed compound from the resin may be determined by preliminary experiment. In the case of 3-acetoxymethyl-7β-(4-carboxybutanamido)ceph-3-em-4-carboxylic acid a suitable solvent is acetone.

The compounds of formula (I) where X is the residue of a nucleophile or a hydroxy group or a hydrogen atom may be recovered from the aqueous media in which they have been prepared in a similar manner to that described above. This will depend on the nature of the X group and variations in the extraction conditions may be necessary. These can readily be determined by preliminary trial and error experiments.

Compounds of formula (I) in which R is -COOH may be converted into the corresponding 7β-amino compounds by reacting the corresponding 4-ester with an imide-halide forming component, converting the imide halide so obtained into the imino ether and decomposing the latter. If desired, the ester group may be split off by hydrolysis or hydrogenolysis (if suitable) to yield the 4-carboxylic acid.

Suitable imide halide forming components include acid halides derived from the phosphorus acids, the preferred compounds being the chlorides such as, for example, phosphorus oxychloride or phosphorus pentachloride.

This method of N-deacylation is described in greater detail in British Pat. Nos. 1,041,985 and 1,119,806; Belgian Pat. No. 719,712 and in South African Pat. specifications Nos. 68/5048 and 68/5327.

Compounds of formula (I) in which R is -CO.COOH are preferably reduced, for example using an alkali metal borohydride, to the corresponding compounds in which R is -CH(OH)COOH, before the modified side chain is removed by the method described in Belgian Pat. No. 719,712.

In consequence, important compounds of formula (I) are those in which (A) R is -CO.COOH and X is an acetate group, namely 3-acetoxymethyl-7β-(5-carboxy-5-oxopentanamido) ceph-3-em-4-carboxylic acid and (B) R is -COOH and X is an acetate group, namely 3-acetoxymethyl-7β-(4-carboxybutanamido) ceph-3-em-4-carboxylic acid. These compounds are key intermediates in the production of 7-ACA from the naturally occurring cephalosporin C. Compound (B) (R = -COOH) is especially important in this respect.

The starting compounds of the process according to invention wherein X is the residue of a nucleophile may be prepared by reacting cephalosporin C with a nucleophile. Examples of such nucleophiles are: 1) Pyridine or other hetrocyclic weak tertiary bases as described in British Pat. No. 912,541, i.e., a heterocyclic compound having a weakly basic tertiary nitrogen atom as a member of a heterocyclic ring system and being a weaker base than ammonia. The heterocyclic weak tertiary base may contain e.g. an acidic, sulphonamido or basic substituent (in addition to the tertiary nitrogen atom).

Such heterocyclic weak tertiary bases include pyridine, nicotinamide, nicotinic acid, collidine, quinoline, pyrimidines, thiazoles and sulphonamide derivatives of the foregoing bases, such as sulphadiazine, sulphathiazole and sulpha-pyridine. 2) Sulphur-linking, nitrogen linking or inorganic nucleophiles as described in British Pat. No. 1,012,943, viz. (a) thiourea and substituted thioureas including aliphatic, aromatic, alicyclic and heterocyclic substituted thioureas; (b) aromatic and aliphatic thioamides e.g. thioacetamide and thiosemicarbazide; (c) thiophenol and substituted thiophenols; (d) substituted and unsubstituted primary and secondary aromatic amines, preferably free from tertiary nitrogen heterocyclic substituents; (e) thiols and substituted thiols, particularly amino thiols and substituted aminothiols; (f) metal salts, particularly alkali metal salts, of azide ion ($N_3^-$), hydrogen phosphate ion ($HPO_4^{--}$), and thiosulphate ion ($S_2O_3^{--}$). (g) pyrroles and substituted pyrroles, e.g. alkyl pyrroles.

Suitable nucleophiles of group (a), the thioureas, include members of the formula $$\begin{array}{c} R^4 \\ \diagdown \\ R^5 \end{array} N-\underset{\underset{S}{\parallel}}{C}-N \begin{array}{c} R^6 \\ \diagup \\ R^7 \end{array}$$

(in which $R^4$, $R^5$, $R^6$ and $R^7$ may be the same or different and each represents a hydrogen atom or an alkyl e.g. of 2 or 3 carbon atoms, cycloalkyl, alkenyl, aryl, aralkyl group, or a substituted group of any of these types, or $R^4$ and $R^6$ together represent an alkylene group e.g. an ethylene group). Examples of such thioureas include thiourea itself, N-phenylthiourea, N,N'-dipheny-lthiourea and ethylene thiourea.

The substituted and unsubstituted primary and secondary amines (d) may be exemplified by aniline, p-nitro aniline p-nitro-N-methyl aniline, sulphanilic acid and p-amino benzoic acid; the group also covers the naphthylamines such as α-naphthylamine and substituted naphthylamines.

Substituted thiols include aminothiols and substituted aminothiols as nucleophiles of group (c). Examples of such nucleophiles include 2-aminoethanethiol, 2-amino-2-methyl-propane-1-thiol, 3-dimethylaminopropane-1-thiol and 2-piperidinoethane-1-thiol.

The anions employed as nucleophile in the form of their metal salts are preferably in the form of their alkali metal salts, e.g. sodium salts.

As substituted thiophenols may be mentioned those substituted in the nucleus with an amino or substitued amino group e.g. alkylamino or dialkylamino. Simple examples of such thiophenols are therefore o- and p- amino thiophenol, also compounds derived from thiophenols containing conjugated electron attracting group, i.e., such a group in an o or p-position or, if desired, in more than one such position. Important examples of this type of nucleophile are various nitrothiophenols e.g. o-nitrothio-phenol and o,p-dinitrothiophenol.

The term "electron attracting group" is, of course, well-known in organic chemistry and refers to a substituent which attracts electrons more than hydrogen does (see for example A. M. Remick "Electronic Interpretations of Organic Chemistry," John Wiley & Sons Inc., New York, 1943).

Examples of electron attracting groups which may be present on the above nucleophiles are nitro groups, nitroso groups, carbonyl groups, carboxyl groups, cyano groups and trifluoromethyl groups. Important members of the sub-class (e) are compounds derived from heterocyclic compounds containing appropriate substituents and which are 5- or 6-membered rings and heterocyclic compounds of this type fused to a 6-membered carbocyclic ring e.g. a benzene ring. Hetero atoms which may be present in the ring include nitrogen, sulphur and oxygen at least one of which must be nitrogen. Usually the mercapto group will be attached to a carbon atom of the heterocycle and a heterocyclic nitrogen atom will be adjacent to this carbon atom. The heterocycle may contain other substituents e.g. N-alkyl, ketonic oxygen, etc. The sub-class therefore includes derivatives of thiazoline, hydantoin, imidazole, thiazole, oxazole, etc. but it should be understood that it does not include cyclic thioureas.

Examples of heterocyclic nucleophiles which may be used thus include 2-mercaptothiazoline, 2-mercaptohydantoin, 1-methyl-2-mercapto-imidazole, 2-mercapto-imidazole, 2-mercapto-benzimidazole, 2-mercapto-benzothiazole, 2-mercaptobenzoxazole and 2-mercapto-pyridine.

Examples of such nucleophiles thus include:

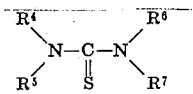

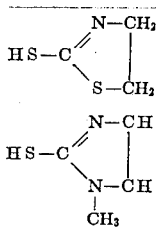

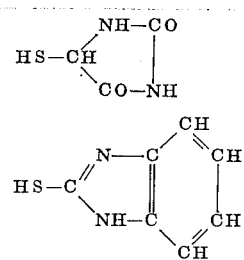

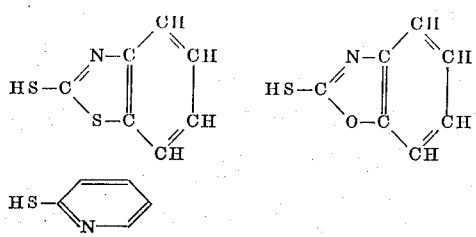

It should be understood that although these heterocyclic compounds are described as thiol (mercapto) or thione compounds they may exist as thione, mercapto zwitterion tautomers. It will be appreciated that the heterocyclic compounds are described as mercapto or thione compounds for reasons of convention. 3) Sulphur-linking nucleophiles as described in British Pat. No. 1,059,562 of the formula

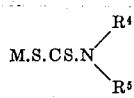

(in which M is an alkali metal or an ammonium group, $R^4$ is a hydrogen atom or an aliphatic, araliphatic or aryl group and $R^5$ is an aliphatic, araliphatic or aryl group or $R^4$ and $R^5$ together form a divalent group).

The group M in the above formula is conveniently sodium or potassium.

Where $R^4$ and/or $R^5$ is an aliphatic group this is preferably an alkyl group containing 1–6 carbon atoms e.g. methyl. Where either group is an araliphatic group this may be a benzyl group and where either group is an aryl group this may be a phenyl group. As is stated above $R^4$ and $R^5$ may together form a divalent group. This may be a divalent hydrocarbon group e.g. $-(CH_2)_n$- where $n$ is 4 or 5 or a C-alkylated, aralkylated or arylated derivative thereof. Thus $R^4$ and $R^5$ together with the adjacent nitrogen atom may form a piperidino group.

Compounds of the above formula are conveniently prepared according to the following equation:

$$R^4R^5NH + CS_2 + MOH \rightarrow R^4R^5N \cdot CS \cdot SM$$

(where $R^4$, $R^5$ and M have the meanings defined above). They are advantageously used in the form of their alkali metal salts. 4) Nitrogen linking nucleophiles as described in British Pat. Nos. 1,030,630, 1,082,943 and 1,082,962. These are nucleophiles (a) of several formula

where Z is a loweralkyl, carbamoyl, N-monoloweralkylcarbamoyl, N,N-dimethylcarbamoyl, loweralkoxycarbonyl, hydroxyloweralkyl, N-(hydroxyloweralkyl) carbamoyl or carbamoylloweralkyl group and $p$ is 0, 1, 2 or 3, It should be understood that the pyridine group may be substituted with two or more different species of the group Z.

The terms "lower alkyl" and "lower alkoxy" as used above indicate groups containing 1-6 carbon atoms, preferably 1 or 2 carbon atoms.

(b) of formula:

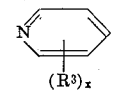

wherein $R^3$ is an alkyl, hydroxyalkyl, N-hydroxyalkylcarbamoyl or alkanoyloxy group, said alkyl moieties containing not more than four carbon atoms and, $x$ is 1 or 2.

Where $x = 2$ the $R^3$ groups need not be the same.

(c) of general formula

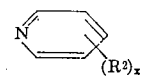

where $R^2$ is a carbamoyl group, a carboxy group or a lower alkoxycarbonyl group and $x$ is 1 or 2.

Where $x = 2$ the $R^2$ groups need not be the same. 5) Sulphur linking nucleophiles as described in British Pat. No. 1,101,423 of formula $R^2YH$ where Y is the group $-SO_2-;-S-SO_2-$ or $-S-CX-$, X being a sulphur or oxygen atom; $R^2$ is an aliphatic, aryl, araliphatic, heterocyclic, or heterocyclic substituted aliphatic group or, where Y is the group $-SO_2-$, $-S-CS-$, a hydroxy group or alkoxyl group respectively.

The heterocyclic moities are preferably 5- or 6-membered rings.

The group $R^2$ is preferably an aryl e.g. phenyl or heterocyclic group, especially in the case of compounds where Y is the group $-S-CX$.

$R^2$ may also be a substituted phenyl group e.g. substituted with cyano, nitro, lower alkoxy or lower alkylthio. The term "lower" indicates that the groups in question have 1-4 carbon atoms.

The group $Y-R^2$ may have the formula

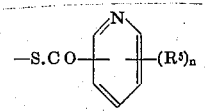

where the $-S.CO.-$ group is attached $\alpha$, $\beta$ or $\gamma$, preferably $\alpha$ or $\gamma$ and $R^5$ is a $C_1-C_4$ alkyl group or a fused benzene ring and $n$ is 0, 1 or 2, e.g. using thiopicolinic acid or its sodium salt.

Alternatively the group $Y-R^2$ may have the formula

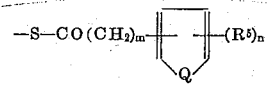

where $m$ is 0 or 1, Q is oxygen, sulphur, NH or N-alkyl $(C_1-C_4)$ and $R^5$ and n have the above meanings. Where Q=NH it may be necessary to protect the hydrogen atom during the preparation of the thio-acid.

This list of nucleophiles is not limiting and is given purely by way of illustration. Where X is a hydroxy group the compound may be prepared by the methods described in British Pat. No. 1,121,308, that is by hydrolysing cephalosporin C with an esterase derived from wheat germ or from a species of the genus Rhizobium, e.g. Rhizobium trifolii, Rhizobium lupinii, Rhizobium janonicum, Rhizobium leguminosarum, or Rhizobium phaesoli, for instance Rhizobium trifolii isolated as wild-type strains from Trifolium dubium.

Where X is a hydrogen atom the compound may be prepared by the method described in British Pat. No. 957,569.

For the better understanding of the invention the following Examples are given by way of illustration only:

PRELIMINARY

Cultures were grown initially in shake flasks, and subsequently in stirred fermentors, containing the medium described by Sentheshanmuganathan and Nickerson (1962), J. Gen. Microbiol. 27, 465, with either methionine or alanine as the nitrogen source.

ESTIMATION OF D-AMINO ACID OXIDASE ACTIVITY

Amino acid oxidase (AAO) activity was determined spectro-photometrically by following the rate of formation of hydrogen peroxide ($H_2O_2$).

The method is based on the coupled reactions shown in equations 1 and 2.

(1)
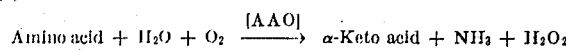
$$\text{Amino acid} + H_2O + O_2 \xrightarrow{[AAO]} \alpha\text{-Keto acid} + NH_3 + H_2O_2$$

(2)
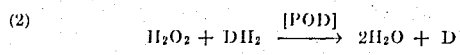
$$H_2O_2 + DH_2 \xrightarrow{[POD]} 2H_2O + D$$

Hydrogen peroxide in the presence of peroxidase (POD) oxidises the hydrogen donor o-phenylenediamine ($DH_2$) to a brown dye (D).

The assay was carried out at 37° in a glass cuvette with a 1 cm light path and the formation of the brown dye was followed at 420 nm. The reaction mixture consisted of 1.0 ml 0.1 M sodium pyrophosphate buffer pH 8.1, 0.5 ml o-phenylenediamine solution (0.02 percent o-phenylenediamine in water), 0.3 ml substrate (1 percent potassium cephalosporin C or 2 percent D-alanine in sodium pyrophosphate buffer pH 8.1), 0.01 ml peroxidase (10 mg/ml aqueous solution) and sufficient water to make the final volume 2.8 ml.

The reaction was started by the addition of 0.2 ml enzyme solution to the reaction mixture. The blank was run under identical conditions using water in place of the substrate.

The linear increase in optical density at 420 nm during the first 5 minutes was used to measure the AAO activity.

A unit of enzyme activity is defined as the quantity of enzyme which, at 37° and pH 8.1, produces a change in optical density of 0.001/min.

ACTIVATION OF TRIGONOPSIS VARIABILIS

Samples (10 ml) of whole Trigonopsis variabilis fermentation broth were centrifuged (1,400 g) for 5 minutes and the supernatants discarded. The wet pellets of sedimented cells so formed were subjected to various treatments, as follows:

a. stored at 4° C and then suspended in water (10ml)

b. suspended in 0.01 M sodium pyrophosphate buffer, pH 8.1 (10 ml) and sonicated for 30 minutes at 20 KHZ in an M.S.E. (Model 60W) ultrasonic Disintegrator, then clarified by centrifugation c. frozen at −20°C for not less than 1 hour then thawed by standing at room temperature and suspended in water (10 ml)

d. suspended in the following reagents (10 ml) at 4° C for 24 hours, centrifuged for 5 minutes at 1,400 g. and the cells resuspended in water (10 ml):

Digitonin (1 percent, w/v)
Span 20 (1 percent, v/v) (a surfactant, viz sorbitan monolaurate)
NaOH (N/100)
Cyclohexane (95 percent, v/v; i.e., 9.5 ml cyclohexane and 0.5 ml water)
Acetone
Benzene (2 percent, v/v) and n-butanol (4 percent, v/v)
n-Butanol(2.5 percent, v/v) and toluene (1 percent, v/v)

All the samples were assayed for D-amino acid oxidase activity. The results are shown in the following Table I.

TABLE I

| Treatment | D-amino acid oxidase activity, units/ml (average) |
| --- | --- |
| Stored at 4°C | 0 |
| Sonicated | 735 |
| Frozen and thawed | 782 |
| Digitonin | 516 |
| Span 20 | 640 |
| NaOH | 765 |
| Cyclohexane | 290 |
| Acetone | 420 |
| Benzene/n-butanol | 390 |
| n-Butanol/toluene | 832 |

Further work on activation of Trigonopsis variabilis was performed using cultures of higher D-amino acid oxidase activity. The activating agents were (a) surface active agents; (b) organic solvents; and (c) osmotic shock

SURFACE ACTIVE AGENTS 10 ml. samples of a culture broth of Trigonopsis variabilis (stored at 4° C) were centrifuged (1,400 g.) for 5 minutes and the supernatant discarded. The cell pellet was resuspended in an 0.1 percent solution of the appropriate surface active agent in 0.1M sodium pyrophosphate buffer, pH 8.1, and incubated at constant temperature for a fixed length of time. The cell suspension was agitated for 30 seconds at the beginning of the incubation period and then at 5 minute intervals throughout the incubation. In all cases the conditions of incubation were as follows:

5 min : 4° C
30 min : 4° C
5 min : 37° C
30 min : 37° C

Following incubation, the cell suspension was cooled (where appropriate) to 4° C, centrifuged (1,400 g.) for 5 minutes and the supernatant carefully decanted off and discarded. The cell pellet was then washed by resuspending in distilled water, centrifuged for a further 5 minutes, and the supernatant decanted off. The final cell pellet was resuspended in 0.01M sodium pyrophosphate buffer, pH 8.1, and diluted to give 50 – 100 units/ml of activity. All determinations of D-amino acid oxidase activity were performed using the spectrophotometric assay described previously.

All treatments were performed in duplicate and the final result expressed as a mean value.

The final suspension was examined microscopically and in all cases the cells appeared to have remained intact and were indistinguishable at a magnification of x 900 from untreated cells, but some change in internal structure was detected by an electron microscope.

The D-amino acid oxidase activities arising from different methods of treatment were compared with the activity of untreated cells and with the activity of a crude cell-free enzyme preparation. In the latter case the enzyme was released from the cells by ultrasonic disintegration for 30 minutes at 4°C in the presence of 0.01M sodium pyrophosphate buffer, pH 8.1. This sonicated extract was clarified by centrifugation at 38,000 g. for 15 minutes at 4°C prior to assay. The results were as follows:

TABLE II (a)

| Surface active agent: | D-amino acid oxidase activity, Units/ml and treatment time/temp | | | |
|---|---|---|---|---|
| | 5 min/ 4°C | 30 min/ 4°C | 5 min/ 37°C | 30 min/ 37°C |
| Cetyltrimethyl ammonium bromide | 2,070 | 3,120 | 2,380 | 2,590 |
| Cetyl pyridinium chloride | 2,380 | 2,250 | 2,520 | 2,260 |
| Cetyldimethyl benzylammonium chloride | 2,320 | 2,350 | 2,130 | 2,520 |
| Sodium desoxycholate | 1,200 | 1,080 | 1,010 | 1,260 |
| Digitonin | 1,100 | 1,410 | 1,970 | 2,260 |
| Sodium dodecyl sulphate | 1,980 | 1,870 | 2,090 | 2,160 |

TABLE II (b)

| Controls | Mean D-amino acid oxidase activity, Units/ml |
|---|---|
| Untreated cells | no detectable activity |
| cell-free enzyme preparation | 1,920 |

Further activation tests were carried out using a solution of Triton X100.

Samples (5 ml.) of *T. variabilis* fermentation broth were centrifuged at 1,400 g for 5 minutes and the supernatant discarded. The wet cell pellets so formed were suspended in 0.1M sodium pyrophosphate buffer pH 8.1 (10 ml) containing Triton X100. The activation conditions and treatment of the cells before assay were carried out as described immediately above except that the incubations were carried out only at 4° and 37° for 30 minutes. The results were as follows:

TABLE III(a)

| Triton X100 concentration (%) | D-amino acid oxidase activity (units/ml) | |
|---|---|---|
| | Activation at 4° | Activation at 37° |
| 1.0 | 1,680 | 15,600 |
| 10.0 | 4,200 | 20,800 |
| 20.0 | 4,600 | 22,000 |

TABLE III (b)

| Controls | D-amino acid oxidase activity (units/ml) |
|---|---|
| Untreated cells | No detectable activity |
| Cell free enzyme preparation | 22,800 |

ORGANIC SOLVENTS

Samples from a culture broth were prepared as described in section (a) above except that incubation was performed in the presence of various organic solvents at two different concentrations. Prior to incubation the washed cell pellet was resuspended in 0.1M sodium pyrophosphate buffer, pH 8.1, and to this suspension the appropriate solvent (1 percent or 10 percent) was added (irrespective of whether or not the mixture was miscible.)

The results were as follows; "n.d." indicates no detectable activity:

TABLE IV(a)

| Solvent | D-amino acid oxidase activity, Units/ml and treatment time/temp | | | | |
|---|---|---|---|---|---|
| | Concn | 5 min/ 4°C | 30 min/ 4°C | 5 min/ 37°C | 30 min/ 37°C |
| Ethanol | 10% | n.d. | 250 | 210 | 325 |
| n-Propanol | 10% | 485 | 380 | 490 | 620 |
| n-Butanol | 10% | 2,770 | 2,300 | – | – |
| Benzene | 1% | 4,480 | 4,600 | 4,060 | 4,080 |
| | 10% | 3,900 | 5,080 | 4,500 | 3,780 |
| Toluene | 1% | 4,400 | 4,060 | 4,160 | 4,525 |
| | 10% | 4,388 | 4,490 | 4,145 | 3,840 |

TABLE IV(b)

| Controls | Mean D-amino acid oxidase activity, (Units/ml) |
|---|---|
| Untreated cells | n.d. |
| cell-free enzyme preparation | 3,730 |

In like manner, wet cell pellets obtained from 5 ml. samples of *T. variabilis* fermentation broth of higher D-amino acid oxidase titre were treated with 1 percent and 10 percent solutions of 2-phenylethanol using the same procedures as described above, the incubations being carried out at 4° C and 37° C for 30 minutes. The results were as fllows:

TABLE V(a)

| Treatment | D-amino acid oxidase activity (units/ml) | |
|---|---|---|
| | Activation at 4° | Activation at 37° |
| 2-phenylethanol 1% | 2,000 | 5,800 |
| 2-phenylethanol 10% | 9,200 | 9,600 |

TABLE V(b)

| Controls | D-amino acid oxidase activity (units/ml) |
|---|---|
| Untreated cells | No detectable activity |
| Cell free enzyme preparation | 12,000 |

OSMOTIC SHOCK

The following buffer solutions were employed; tris-HCl indicates 1,1-di(hydroxymethyl)-2-hydroxyethylamine hydrochloride and EDTA indicates ethylenediaminetetraacetic acid. Buffers (2) and (4) were of high osmotic pressure by reason of containing 2M sucrose.

TABLE VI(a)

| Buffer | 0.01M Tris-HCL pH 8.0 | 2M sucrose | 0.01M MgSO$_4$ | 1mM EDTA |
|---|---|---|---|---|
| (1) | + | − | + | − |
| (2) | + | + | + | − |
| (3) | + | − | + | + |
| (4) | + | + | + | + |

Samples (5ml) of *T. variabilis* fermentation broth were centrifuged at 1,400 g for 5 minutes and the supernatants discarded. The wet pellets so formed were resuspended in buffers (1) or (3) (10 ml) and again centrifuged. This washing procedure was repeated, the cell pellet finally resuspended in buffers (1), (2), (3) or (4) (10 ml) and incubated for 30 minutes at 37° C.

Each suspension was then diluted to 100 ml with cold buffer (1) or (3) and 10 ml samples removed. After centrifugation at 1,400 g the cell pellet was resuspended in 0.01M sodium pyrophosphate buffer, pH 8.1 and diluted with buffer before assay.

The following results were obtained. For comparison a 5 ml sample of fermentation broth was converted to a cell free enzyme preparation.

TABLE VI(b)

| Buffer used in incubation | D-amino acid oxidase activity (units/ml) |
|---|---|
| (1) | n.d. |
| (2) | 5,600 |
| (3) | n.d. |
| (4) | 6,050 |
| Cell free enzyme preparation | 23,600 |
| Untreated cells | n.d. |

OXIDATION OF CEPHALOSPORIN C

EXAMPLE 1 a. *Trigonopsis variabilis* (C.B.S. 4095) was grown in a synthetic medium containing methionine, as described in the preliminary to the examples. The cell suspension was harvested by centrifugation, and the wet cell mass retained.

The wet cells were divided into four aliquots and 'activated' by freezing to −20° C followed by thawing at room temperature. After dilution with water this yielded a suspension of cells of 61.7 percent wet wt/vol. When this suspension was assayed using the spectrophotometric assay described previously, it was found to contain 32,200 units enzyme activity/ml.

40 g. of a potassium cephalosporin C preparation, having a purity of 68 percent (i.e., 27.2 g. potassium cephalosporin C) was dissolved in 2 litres of 0.2M sodium pyrophosphate buffer, pH 8.1, containing sodium azide (260 mg.) and diluted to 3,990 ml with water. The solution, contained in a stirred vessel was equilibrated in a water bath at 33° C for 30 min. The conversion was started by adding 10 ml of the cell suspension previously described and was continued for 3 hours using an air flow rate of 3 litres/minute together with an agitation rate of 550 rpm. The conversion was terminated by centrifugation of the contents of the vessel at 2,100 g for 1 hour.

Analysis by quantitative (ultraviolet absorption) thin-layer chromatography of samples withdrawn at intervals from the reaction vessel showed that the conversion was complete in approximately 1.5 hours and that 68 percent of the cephalosporin C had been converted to 3-acetoxymethyl-7β-(4-carboxybutanamido)ceph-3-em-4-carboxylic acid. The level of enzyme used corresponded to 12.8 units/mg cephalosporin C (free acid).

The above product was extracted from the clarified conversion mixture as follows:

2 litres of the conversion mixture was adjusted to pH 1.5 using hydrochloric acid and extracted into 8 × 1.6 litres ethyl acetate. The combined ethyl acetate extracts were evaporated under vacuum to approximately 800 ml and dried overnight using anhydrous sodium sulphate. The dried ethyl acetate extract was further evaporated under vacuum to 50 ml and then added slowly to 700 ml light petroleum (60°–80°) whilst stirring vigorously.

The resulting precipitate was filtered off, and dried under vacuum over alumina to yield 3-acetoxymethyl-7β-(4-carboxybutanamido)ceph-3-em-4-carboxylic acid (9.83 g) as a pale yellow solid having a purity of 84 percent [$E_{1cm}^{1\ percent} = 201$ (260 nm)]. When this solid was subjected to analysis by thin-layer chromatography no other u.v. (254 nm) absorbing zones could be detected. This corresponds to an overall conversion of potassium cephalosporin C to the above product of 72 percent.

EXAMPLE 2

Cells of *T. variabilis* from a 1 litre sample of fermentation broth were harvested by centrifugation at 2,100 g for 30 minutes at 4° C. The supernatant was discarded and the cell pellet resuspended in 1 litre sodium pyrophosphate buffer, pH 8.1. 100 ml aliquots of this cell suspension were added to 10 ml toluene in 250 ml flasks. The immiscible mixture of toluene and the aqueous cell suspension was incubated on a rotary shaker (300 rpm) at 37° C for 2 hours. The contents of the flasks were then cooled to 4° C, centrifuged at 2,100 g for 30 minutes and the supernatant layers removed and discarded. The cell pellet was then resuspended in 100 ml distilled water, re-centrifuged and the supernatant removed and discarded. The cell pellets from all the flasks thus treated were then combined and made up to a total volume of 200 ml of 0.1M sodium pyrophosphate buffer, pH 8.1. This suspension was assayed and was found to contain 22,880 units enzyme activity/ml.

A conversion of cephalosporin C was carried out under identical conditions to those outlined in Example 1, the reaction being started by the addition of 10.5 ml of the cell suspension described above.

Analysis by quantitative thin layer chromatography of samples withdrawn at intervals from the reaction vessel showed that the conversion was complete in approximately 2 hours and that 68 percent of the cephalosporin C had been converted to 3-acetoxymethyl-7β-(4-carboxybutanamido)ceph-3-em-4-carboxylic acid. The level of enzyme used corresponded to 9.6 units/mg cephalosporin C (free acid).

EXAMPLE 3

4.8 litres culture broth from a fermentation of *Cephalosporium acremonium* (Brotzu) was centrifuged at 2,100 g for 1 hour at 4° C and the supernatant retained. The pH of the supernatant was adjusted to pH 4.5 with sulphuric acid and clarified by centrifugation at 2,100 g for 1 hour at 4° C. The supernatant was retained, adjusted to pH 2.8 with sulphuric acid and clarified by centrifugation as described above. The resulting supernatant was adjusted to pH 8.1 with NaOH and again clarified by centrifugation. This 'protein filtrate' (3.23 litres) was shown by microbiological assay to contain 22.3 g potassium cephalosporin C. The 'protein filtrate' was diluted to 3.975 litres by the addition of 0.2M sodium pyrophosphate buffer, pH 8.1, containing a total of 260 mg sodium azide.

The above mixture was oxidised under identical conditions to those described in Examples 1 and 2, the reaction being started by the addition of 23 ml of the cell suspension of toluene-treated cells described in Example 2.

Analysis by quantitative thin layer chromatography of samples withdrawn at intervals from the reaction vessel showed that the conversion was complete in approximately 2.5 hours and that 73 percent of the cephalosporin C had been converted to 3-acetoxymethyl-7β-(4-carboxybutanamido)ceph-3-em-4-carboxylic acid.

The level of enzyme used corresponded to 25.6 units/mg cephalosporin C (free acid).

EXAMPLE 4

A fermentation broth containing cephalosporin C was purified by filtering off the mycelium and protein (after precipitation). The filtrate, containing 4.8 mg/ml cephalosporin C, was adjusted to pH 8.0 with N NaOH and clarified by centrifugation (18,000 g.).

5 ml of clarified filtrate was mixed with 3 ml of 0.2M-sodium pyrophosphate buffer, pH 8.0, 1 ml of 10 mM-sodium azide and 1 ml of frozen and thawed cell suspension (224 units of D-amino oxidase activity), and was aerated and incubated at 33° C for 4 hours. Examination of the resultant mixture by thin layer chromatography on silica coated plates developed with 80 percent aqueous acetone showed that 90 percent of the cephalosporin C had been used up and that most of this had been converted to 3-acetoxymethyl-7β-(5-carboxy-5-oxopentanamido)ceph-3-em-4-carboxylic acid and 3-acetoxymethyl-7β-(4-carboxybutanamido)ceph-3-em-4-carboxylic acid.

EXAMPLE 5

40g of a potassium cephalosporin C preparation, having a purity of 68 percent (i.e., 27.2g potassium cephalosporin C) was dissolved in 1.5 litres of 0.2M sodium phosphate buffer, pH 8.1. 1 ml catalase solution was added, containing 20,000 units enzyme activity. (1 unit catalase enzyme activity is defined as that which will decompose 1 μmole hydrogen peroxide/min. at pH 7.0 at 25°).

The solution, contained in a stirred vessel, was diluted to 3,980 ml with water and equilibrated in a water bath at 33° C for 30 min. The conversion was started by adding 20 ml of a cell suspension similar to that described in Example 1. When this suspension was assayed using the spectrophotometric assay described previously it was found to contain 12,100 units enzyme activity/ml. The conversion was continued for 2.5 hours using an air flow rate of 3 litres/minute together with an agitation rate of 550 rpm. The conversion was terminated by centrifugation of the contents of the vessel at 2,100g for 1 hour.

The product was extracted as follows: 3,900 ml of the conversion mixture was adjusted to pH 1.5 using hydrochloric acid and divided into two equal aliquots. Each aliquot was extracted using 7 × 800 ml ethyl acetate and the combined ethyl acetate extracts from both aliquots were evaporated under vacuum to approximately 2 litres and dried overnight using anhydrous sodium sulphate. The dried ethyl acetate extract was further evaporated under vacuum to 100 ml and then added slowly to 600 ml light petroleum (60° – 80°) whilst stirring vigorously.

The resulting precipitate was filtered off in two batches and dried under vacuum over alumina to yield 3-acetoxymethyl-7β-(5-carboxy-5-oxopentanamido)ceph-3-em-4-carboxylic acid as a pale yellow solid. The two samples of solid obtained (6.89g and 4.96g) had purities of 56 percent [$E_{1cm}^{1\ percent} = 124$ (260nm)] and 50% [$E_{1cm}^{1\ percent} = 112$ (260nm)] respectively. This corresponds to an overall conversion of potassium cephalosporin C to the above product of 25 percent.

EXAMPLE 6

Production of 3-acetoxymethyl-7β-(4-carboxybutanamido)-ceph-3-em-4-carboxylic acid 1. Using sodium azide as catalase inhibitor Cells of *T. variabilis* from 2.7 litres of fermentation broth were harvested by centrifugation at 2,100 g for 30 minutes at 4° C. The supernatant was discarded and the cells resuspended in 2.7 litres 0.1M sodium pyrophosphate buffer, pH 8.1. This suspension was incubated in a stirred vessel at 37° and 300 ml toluene was added. The incubation was continued for 4 hours, after which time the vessel contents were centrifuged at 2,100 g for 30 minutes at 4° C, and the supernatant layers removed and discarded. The cell pellets were resuspended in a total volume of 3 litres distilled water, the centrifugation repeated, and the supernatant removed and discarded. The cells were finally resuspended in 500 ml 0.1M sodium pyrophosphate buffer, pH 8.1. When this cell suspension was assayed it was found to contain 24,000 units enzyme activity/ml.

20 g of potassium cephalosporin C preparation having a purity of 70 percent was dissolved in 2 litres 0.1M sodium pyrophosphate buffer, pH 8.1, containing sodium azide (1.3 g). The solution, contained in a stirred vessel, was equilibrated in a water bath at 33° for 30 minutes. The conversion was started by adding 28 ml of the cell suspension previously described and continued for 2 hours using an air flow rate of 6 litres/minute together with an agitation rate of 550 rev/min. The conversion was terminated by centrifugation of the contents of the vessel at 2,100 g carried out overnight. The level of enzyme used corresponded to 53 units/mg cephalosporin C acid.

Sodium chloride (150 g) was dissolved in 500 ml of the resulting solution, the pH was adjusted to 1.5 using concentrated sulphuric acid and the solution extracted four times with 200 ml portions of ethyl acetate. The bulked extracts were dried overnight at 4° C using magnesium sulphate. The magnesium sulphate was removed by filtration and the dried ethyl acetate extract evaporated under vacuum to approximately 20 ml. On standing at room temperature the crystalline precipitate which formed was removed by filtration and dried under vacuum to yield the title compound (2.10 g) as a white solid having a purity of 92 percent ($E_{1cm}^{1\ percent}$ = 220 (260 mm)). This corresponded to an overall conversion of potassium cephalosporin C to the above product of 65 percent.

ii. Using pretreatment with sodium azide to inhibit catalase.

Cells of *T. variabilis* were activated as described in Example 6(i). Before use in the conversion, sodium azide (6.5 g) was added to the cell suspension (200 ml) and this was stored overnight at 4° C. The cell suspension was then centrifuged at 2,100 g for 30 minutes at 4° C and the supernatant discarded. The cells were resuspended in 200 ml 0.1M sodium pyrophosphate buffer, pH 8.1 and the centrifugation repeated. The supernatant was again discarded and the cells resuspended in 200 ml buffer. This suspension was assayed and found to contain 17,600 units enzyme activity/ml.

20 g of a potassium cephalosporin C preparation having a purity of 70 percent was dissolved in 2 litres 0.1M sodium pyrophosphate buffer, pH 8.1. The conversion was carried out as described in Example 6(i) using 38 ml of the cell suspension. The level of enzyme used corresponded to 52 units/mg cephalosporin C acid.

The resulting solution was extracted as described previously to yield the title compound (2.05 g) as a white solid having a purity of 91 percent ($E_{1cm}^{1\ percent}$ = 217 (260 mm)). This corresponded to an overall conversion of potassium cephalosporin C to the above product of 63 percent.

iii. Using heat treatment to inhibit catalase

Cells of *T. variabilis* were activated as described in Example 6(i) using a temperature of 50° C instead of 37° C. The resulting cell suspension was assayed and found to contain 17,600 units enzyme activity/ml.

20 g of a potassium cephalosporin C preparation having a purity of 70 percent was dissolved in 2 litres 0.1M sodium pyrophosphate buffer, pH 8.1. The conversion was carried out as described in Example 6(i) using 38 ml of the cell suspension. The level of enzyme used corresponded to 52 units/mg cephalosporin C acid.

The resulting solution was extracted as described previously to yield the title compound (1.85 g) as a white solid having a purity of 92 percent ($E_{1cm}^{1\ percent}$ = 220 (260 mm)). This corresponded to an overall conversion of potassium cephalosporin C to the above product of 57 percent.

We claim:

1. A process for the preparation of a 7β-acylamidocephalosporin having a 7β-substituent selected from the group consisting of 5-carboxy-5-oxopentanamido and 4-carboxybutanamido which includes the step of contacting a corresponding compound having a 7β-(D-5-amino-5-carboxypentanamido) group with activated intact cells of *Trigonopsis variabilis* under aerobic conditions, catalase activity being present in said cells when the desired product has a 7β-(5-carboxy-5-oxopentanamido) group.

2. A process as claimed in claim 1 wherein said cells have been activated by treatment in an aqueous phase with at least one organic solvent selected from the group consisting of ketones, aliphatic and araliphatic mono- and polyhydric alcohols, aliphatic hydrocarbons and aromatic hydrocarbons.

3. A process as claimed in claim 2 wherein said organic solvent is toluene.

4. A process as claimed in claim 1 wherein said cells have been activated by treatment with an aqueous solution of a surface active agent at a concentration of 0.1–10 percent.

5. A process as claimed in claim 1 wherein said cells have been activated by freezing at a temperature below −10° followed by thawing at pH 3–4.

6. A process as claimed in claim 1 wherein said corresponding compound is subjected to the action of said activated cells at a pH of 6 to 8 and a temperature of 30°–40°.

7. A process as claimed in claim 1 wherein catalase in said activated cells is inhibited or inactivated, whereby a product having a 7β-(4-carboxybutanamido) substituent is obtained.

8. A process as claimed in claim 7 wherein said catalase is inhibited by adding sodium azide to the reaction mixture at a concentration of 1mM to 100mM.

9. A process as claimed in claim 7 wherein said activated cells before contact with said corresponding compound have been treated with an aqueous solution of sodium azide of up to molar concentration at a temperature of 0°–40°.

10. A process as claimed in claim 7 wherein said activated cells, before contact with said corresponding compound, have been heat treated to inactivate catalase without substantial inactivation of D-amino acid oxidase.

11. A process as claimed in claim 7 wherein said cells have been simultaneously activated and treated to inhibit or inactivate catalase.

12. A process as claimed in claim 1 wherein said cells have been activated by treatment with alkali.

13. A process as claimed in claim 1 wherein said cells have been activated by osmotic shock.

* * * * *